Patented Mar. 23, 1948

2,438,106

UNITED STATES PATENT OFFICE 2,438,106

PERORAL PENICILLIN COMPOSITIONS

Harvey E. Alburn, West Chester, Pa., Jesse Charney, New York, N. Y., and Finn W. Bernhart, Solon, Ohio, assignors to Wyeth Incorporated, Philadelphia, Pa., a corporation of Delaware No Drawing. Application June 9, 1944,
Serial No. 539,598

5 Claims. (Cl. 167—55)

This invention relates to antibiotic agents, such as penicillin, and especially relates to penicillin compositions to be used for administration per os.

For internal medication at the present time, penicillin is administered parenterally, for example, intramuscularly, intraperitoneally and intravenously. The parenteral mode of administration has been deemed necessary because penicillin taken by mouth is destroyed in the alimentary tract since only an insignificant amount of the penicillin can be detected later in the excreted urine. Thus, it has been observed in the case of typical patients who took 20,000 Oxford units of penicillin by mouth, that only about one to three percent of the dose could later be accounted for in the urine. On the other hand, if the 20,000 Oxford units of penicillin are administered parenterally, about eighty to ninety percent of the amount taken appears in the excreted urine.

The object of the present invention is to provide a peroral, therapeutically efficacious penicillin composition.

We have found that penicillin administered per os simultaneously with a non-toxic buffering agent is therapeutically efficacious. We have found for this purpose that the buffering agent should be of a type that fails to evolve carbon dioxide upon treatment with acid, and preferably should be of a type that yields with the hydrochloric acid of the stomach, a composition having a pH value falling within the range of 3.0 to 7.5.

Trisodium citrate is an especially satisfactory non-toxic buffering agent for producing a penicillin composition which is effective when given perorally to patients. Other buffering agents suitable for the purpose of the invention are tripotassium citrate, disodium phosphate, disodium tartrate, disodium malonate, disodium maleate, sodium acetate, sodium lactate, disodium succinate, disodium fumarate, disodium saccharate, sodium gluconate, alumina, aluminum hydroxide, dipotassium phosphate, dipotassium tartrate, potassium lactate, dipotassium succinate, dipotassium fumarate, dipotassium saccharate, potassium gluconate, dipotassium maleate, magnesium citrate, magnesium tartrate, magnesium maleate, magnesium malonate, magnesium acetate, magnesium lactate, magnesium succinate, magnesium fumarate, magnesium gluconate, and calcium gluconate. In brief, it is believed that most any neutral or slightly alkaline non-toxic compound, capable of reacting with the hydrochloric acid of the stomach to produce a composition having a pH value falling within the range of 3.0 to 7.5 will serve in varying degrees to achieve the objective of the present invention. Obviously, various combinations and permutations of the described compounds are possible to secure the desired pH range. For example, one may use a mixture of equal molar parts of monosodium phosphate and disodium phosphate, or of 2.3 molar parts of disodium phosphate with one molar part of citric acid, or of disodium citrate and disodium phosphate or of calcium citrate and magnesium citrate or of sodium acetate and sodium tartrate. Likewise, such salts need not be isolated and pure, but may be utilized as they occur in certain food products, for example, the penicillin may be incorporated into a milk powder containing appreciable amounts of calcium lactate and like salts with or without lactose to produce a perorally efficacious penicillin composition.

The fundamental principle of our invention is the simultaneous administration of the buffering agent with the administration of the penicillin. For convenience, of course, it is desirable to prepare a dry composition in which the penicillin has been intimately mixed with the buffering compound and such represents the preferred embodiment of our invention. However, if desired, the penicillin and the buffering compound need not be mixed but may be packaged separately, each, however must be in a form to be simultaneously taken by mouth in order to secure the desired therapeutic effect.

It is not necessary that the penicillin be in the form of its pure crystalline salts such as sodium and calcium, since successful medication can also be achieved perorally in this manner with impure concentrates of penicillin. As a matter of fact, one method for the preparation of the penicillin compositions of this invention is to mix the buffering agents, particularly those having an adsorbent action, for instance alumina, directly with the culture media liquid containing the crude penicillin. Upon careful evaporation under vacuum at low temperatures, one may thus obtain a perorally therapeutically effective penicillin composition.

In general, we prefer to select a water-soluble buffering compound which yields a substantially neutral penicillin composition. The amount of the buffering agent taken with respect to the penicillin may be varied over a fairly large range. Thus, trisodium citrate may be compounded with the penicillin in an amount varying from one gram of trisodium citrate for each 1,000 Oxford units of penicillin to one gram of trisodium citrate for each 25,000 Oxford units of penicillin to produce effective therapeutic compositions. However, the most effective mixture appears to be about one gram of trisodium citrate for each 10,000 Oxford units of penicillin.

The following table is set forth to show the action of certain buffering agents of the above described type in preventing the destruction of penicillin administered per os as shown by increased amounts of penicillin detectable in the urine.

*Excretion of penicillin after administration of approximately 20,000 units*

| Patient | Experimental Conditions | Percent of Excreted Penicillin in Urine Up to 8 Hours after Administration |
|---|---|---|
| H. A. | Intramuscular | 81 |
| F. B. | ....do.... | 93 |
| H. A. | By mouth | 3 |
| H. A. | ....do.... | 1 |
| F. E. | ....do.... | 2 |
| H. A. | By mouth with 1 gm. alumina | 16 |
| H. A. | By mouth with 30 ml. of an aluminum hydroxide gel | 16 |
| F. E. | By mouth with 25 ml. 0.3 N phosphate buffer pH 6.8 | 20 |
| F. B. | By mouth with 10 gms. disodium phosphate decahydrate adjusted to pH 7.5 with phosphoric acid | 12 |

| Patient | Urine Vol. | Hours After Administration | Conditions | Percent Penicillin excreted in Urine |
|---|---|---|---|---|
| J. C. | 35 | 0-2 | 5 gm. trisodium citrate plus 20,000 units penicillin sodium salt. | 6.4 |
|  | 30 | 2-4 |  | 2.5 |
|  | 57 | 4-6 |  | 3.3 |
|  |  |  | Total | 12 |
| F. E. | 113 | 0-2 | 5 gm. trisodium citrate plus 20,000 units penicillin sodium salt. | 8.7 |
|  | 87 | 2-4 |  | 3.5 |
|  | 75 | 4-6 |  | 0.8 |
|  |  |  | Total | 13.0 |
| F. E. | 143 | 0-2 | 5 gm. trisodium citrate plus 20,000 units penicillin sodium salt. | 16.7 |
|  | 95 | 2-4 |  | 4.4 |
|  | 88 | 4-6 |  | 1.4 |
|  | 89 | 6-8 |  |  |
|  |  |  | Total | 22.5 |
| F. B. | 158 | 0-2 | 25 gm. glucose plus 5 gm. trisodium citrate plus 20,000 units calcium penicillin. | 13.5 |
|  | 108 | 2-4 |  | 5.2 |
|  | 110 | 4-6 |  | 1.5 |
|  |  |  | Total | 20 |
| J. C. | 115 | 0-2 | 25 gm. glucose plus 5 gm. trisodium citrate plus 20,000 units calcium penicillin. | 10.4 |
|  | 77 | 2-4 |  | 4.2 |
|  | 60 | 4-6 |  | 1.4 |
|  |  |  | Total | 16 |

In the above table the data for the amount of penicillin excreted was determined by the standard Staphylococcus aureus method described in the literature.

The compositions resulting from compounding penicillin with the hereinbefore described buffering agents represent a decided advance in penicillin medication inasmuch as it is no longer necessary to administer the penicillin parenterally in order to secure its extensive beneficial effects. Thus, 160,000 Oxford units of penicillin buffered with trisodium citrate and administered per os each day for two days cured gonorrhea of the type resistant to sulfa drugs as completely as if the penicillin had been administered hypodermically.

The compositions of the invention may be administered in any suitable pharmaceutical dosage form, for example, as a powder, as a pill or tablet, or in the form of a capsule alone or compounded with suitable diluents and excipients.

We claim:

1. A therapeutic composition in dosage form for oral administration producing higher blood-levels of penicillin than are obtained upon oral administration of penicillin alone comprising penicillin and sodium citrate in an amount sufficient to protect the penicillin against therapeutically significant destruction by gastric hydrochloric acid.

2. A therapeutic composition in dosage form for oral administration producing higher blood-levels of penicillin than are obtained upon oral administration of penicillin alone comprising penicillin and aluminum hydroxide in an amount sufficient to protect the penicillin against therapeutically significant destruction by gastric hydrochloric acid.

3. A therapeutic composition in dosage form for oral administration producing higher blood-levels of penicillin than are obtained upon oral administration of penicillin alone comprising penicillin in an orally effective amount and a non-toxic amount of a penicillin-compatible buffering agent of the type failing to evolve carbon dioxide upon acidification, the amount of said buffering agent being sufficient to protect a substantial portion of the penicillin against therapeutically significant destruction by gastric hydrochloric acid.

4. A therapeutic composition in dosage form for oral administration producing higher blood-levels of penicillin than are obtained upon oral administration of penicillin alone comprising penicillin in an orally effective amount and a non-toxic amount of a penicillin-compatible buffering agent of the type failing to evolve carbon dioxide upon acidification, said amount being sufficient to react with the gastric hydrochloric acid to produce a pH within the range of about 3.0 to 7.5.

5. A therapeutic composition in dosage form for oral administration producing higher blood-levels of penicillin than are obtained upon oral administration of penicillin alone comprising penicillin in an orally effective amount and a non-toxic amount of a penicillin-compatible buffering agent of the type failing to evolve carbon dioxide upon acidification, said amount being sufficient to protect a substantial portion of the penicillin against destruction by gastric hydrochloric acid, said buffering agent comprising a salt of a relatively strong base and an organic acid.

HARVEY E. ALBURN.
JESSE CHARNEY.
FINN W. BERNHART.

(References on following page)

REFERENCES CITED

The following references are of record in the file of this patent:

UNITED STATES PATENTS

| Number | Name | Date |
|---|---|---|
| 1,486,002 | Alsleben | Mar. 4, 1924 |
| 1,527,455 | Wershow | Feb. 24, 1925 |
| 1,646,553 | Murlin | Oct. 25, 1927 |
| 2,101,867 | Miller et al. | Dec. 14, 1937 |
| 2,293,359 | Quisling | Aug. 18, 1942 |

FOREIGN PATENTS

| Number | Country | Date |
|---|---|---|
| 10,667 | Australia | 1932 |

OTHER REFERENCES

Lucas, Canadian Chemistry and Process Industries, Sept. 1943, pages 534, 536.

Physician's Bulletin, vol. IX, No. 1, Jan. 1944.

Powell et al., Journ. Indiana St. Med. Assn., July 1942, vol. 35, pages 361–2.

Manuf. Chemist and Mfg. Perfumer, Dec. 1943, vol. 14, pages 380–382.

Chain et al., Endeavour, Jan. 1944, vol. 3, page 11.

Am. J. Pharm., Aug. 1943, pages 302–3.

Meyer et al., Science, July 1942, vol. 96, pages 20 and 21.

Roberts et al., J. Biol. Chem., Jan. 1943, vol. 147, pages 47, 51, 52.

Manufacturing Chemist, December 1943, page 374.

McDermott et al., Science, March 2, 1945, pages 288, 229.

Seeberg et al., Science, August 31, 1945, pages 225–227.

Florey et al., The Lancet (London), March 27, 1943, page 387.

J. Bacteriology, Oct. 1943, pages 386–389.

The Lancet, May 15, 1943, page 605.